United States Patent
Abramson et al.

(10) Patent No.: US 8,275,113 B2
(45) Date of Patent: Sep. 25, 2012

(54) SHARED MAPPING OF A STATION EXTENSION WITHIN A DISTRIBUTED, ENTERPRISE TELECOMMUNICATIONS SYSTEM, TO AN ASSOCIATED TELEPHONE NUMBER

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1118 days.

(21) Appl. No.: 12/167,855

(22) Filed: Jul. 3, 2008

(65) Prior Publication Data

US 2010/0002860 A1    Jan. 7, 2010

(51) Int. Cl.
*H04M 3/42* (2006.01)
*H04M 7/00* (2006.01)

(52) U.S. Cl. ................ 379/225; 379/207.02; 379/232; 379/901; 455/414.1; 455/554.1; 455/555

(58) Field of Classification Search ............ 379/207.02, 379/211.02, 225, 231–234, 901; 455/414.1, 455/417, 554.1, 555
See application file for complete search history.

(56) References Cited

U.S. PATENT DOCUMENTS

| | | | | |
|---|---|---|---|---|
| 4,488,004 A | * | 12/1984 | Bogart et al. | 379/225 |
| 5,247,571 A | * | 9/1993 | Kay et al. | 379/221.09 |
| 5,652,790 A | * | 7/1997 | Andruska et al. | 379/230 |
| 5,761,294 A | * | 6/1998 | Shaffer et al. | 379/230 |
| 5,825,868 A | * | 10/1998 | Diamond | 379/243 |
| 6,542,475 B1 | * | 4/2003 | Bala et al. | 370/271 |
| 6,823,197 B1 | * | 11/2004 | Chen et al. | 455/554.1 |

* cited by examiner

*Primary Examiner* — Harry Hong (74) *Attorney, Agent, or Firm* — Maldjian Law Group LLC; John P. Maldjian, Esq.; Alexander D. Walter, Esq.

(57) ABSTRACT

A method is disclosed that provides the sharing of a station-mapping description with a first private-branch exchange, where the description has been initialized and maintained at a second private-branch exchange. Such a description describes a logical association between a station extension of an enterprise deskset and a telephone number of an off-premises terminal, such as a cell phone. As a result of the sharing across private-branch exchanges, an incoming call from a second employee's cell phone can be recognized, by a first employee being called, as coming from the calling second employee. This is because the incoming call is identified with the telephone extension of the calling employee's deskset terminal in spite of the call being placed from the cell phone, or other telephone number at large. This is particularly important where a large company engineers its enterprise's telecommunications system across multiple private-branch exchanges.

20 Claims, 5 Drawing Sheets

| PBX On-Premises Telephone Number | Off-Premises Telephone Number |
|---|---|
| 732-555-0102 x11 | 201-555-1236 |
| 732-555-0102 x12 | 908-555-3381 |
| ... | ... |
| 732-555-0102 x99 | 212-555-6784 |

SHARED MAPPING OF A STATION EXTENSION WITHIN A DISTRIBUTED, ENTERPRISE TELECOMMUNICATIONS SYSTEM, TO AN ASSOCIATED TELEPHONE NUMBER

FIELD OF THE INVENTION

The present invention relates to telecommunications in general, and, more particularly, to the sharing of call-identifying information across multiple switches in an enterprise system.

BACKGROUND OF THE INVENTION

An organization that wants to provide employees at one location with telephones has, in general, two options. As a first option, the organization can acquire one telephone and one telephone line per employee from the telephone company. As a second option, the organization can acquire one telephone per employee, a small number of telephone lines from the telephone company, and a piece of equipment that enables the employee's telephones to share the small number of telephone lines. In general, the second option is substantially less expensive than the first option. The piece of equipment that enables the employees' telephones to share the small number of telephone lines is called a "private-branch exchange" or "PBX."

Figure 1:
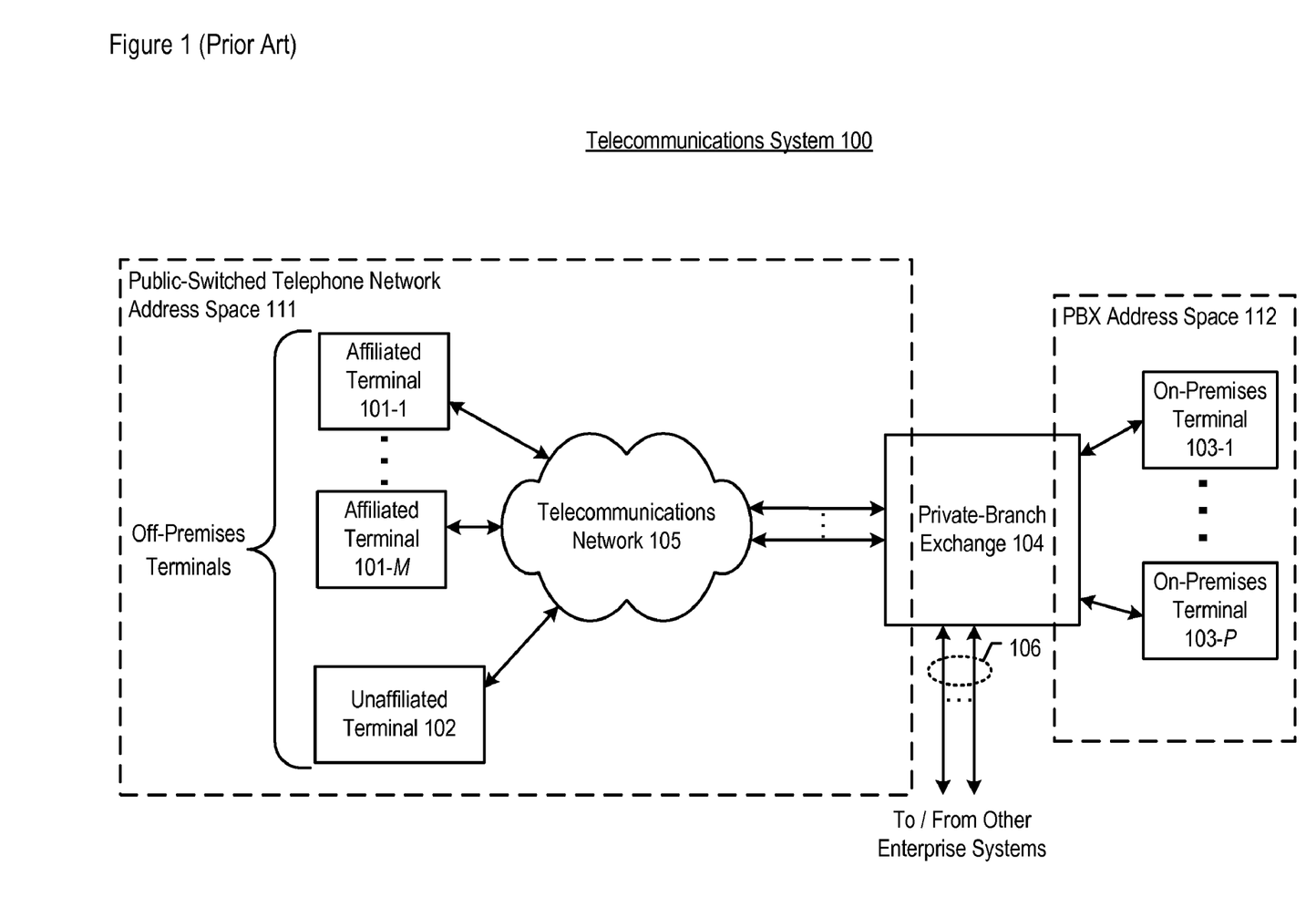
FIG. 1 depicts a schematic diagram of telecommunications system 100 in the prior art.

FIG. 1 depicts a schematic diagram of telecommunications system 100 in the prior art, which reflects the second option. Telecommunications system 100 comprises affiliated off-premises telecommunications terminals 101-1 through 101-M, wherein M is a positive integer; unaffiliated off-premises telecommunications terminal 102; affiliated on-premises telecommunications terminals 103-1 through 103-P, wherein P is a positive integer; private-branch exchange telephone system 104; and telecommunications network 105, interconnected as shown.

The terms "affiliated" and "unaffiliated," as they apply to the off-premises terminals, refer to whether an off-premises terminal is affiliated with an on-premises terminal (i.e., a terminal served by private-branch exchange 104). The affiliation of one terminal with another terminal concerns, among other things, whether an incoming call intended for an enterprise user at exchange 104 is delivered to both an on-premises terminal and an off-premises terminal. The relationship of an on-premises terminal such as terminal 103-1 with an affiliated off-premises terminal such as terminal 101-1 is described later and with respect to FIG. 2.

Private-branch exchange 104 is capable of switching incoming calls from telecommunications network 105 (e.g., the Public Switched Telephone Network, etc.) via one or more transmission lines to any of on-premises terminals 103-1 through 103-P. Private-branch exchange 104 is also capable of handling outgoing calls from any of on-premises terminals 103-1 through 103-P to telecommunications network 105 via one or more transmission lines that connect private-branch exchange 104 to telecommunications network 105.

Private-branch exchange 104 is capable of also extending an incoming call to a telephone number in telecommunications network 105, in addition to switching the incoming call to on-premises terminal 103-p, wherein p is an integer between 1 and P, inclusive. The telephone number that is extended-to in telecommunications network 105 corresponds to an affiliated terminal 101-m, wherein m is an integer between 1 and M. Private-branch exchange 104 might also be directly connected to one or more additional PBXs, or other types of switches, via voice trunk group 106, which comprises one or more voice trunks.

In addition, private-branch exchange 104 is capable of providing telecommunications features that enable the forwarding of calls, the transferring of calls, conferencing, etc. Typically each user of an on-premises terminal 103-p can create a customized profile that is stored at private-branch exchange 104 and indicates to private-branch exchange 104 how to present information to and respond to signals from on-premises terminal 103-p and its affiliated terminal 101-m, wherein m is equal to p. A customized profile might include information such as defaults for various settings and options, what language to use for voice prompts, what menu items to present, how to associate number keys to menu items, and so forth.

FIG. 1 also depicts the address spaces that are relevant to telecommunications network 100 in the prior art. The term "address space" refers to an addressable region of telephone service. Address space 111 represents the addressable region served by telecommunications network 105. Address space 112 represents the addressable region served by private-branch exchange 104.

Private-branch exchange 104 acts as a "bridge" between address space 111 and address space 112. When a calling party places a call to someone served by private-branch exchange 104, the calling party uses a dialing sequence that includes a telephone number that belongs to telecommunications network 105 and residing in address space 111. As part of the dialing sequence, the calling party also uses an extension number that allows access to one of the on-premises telecommunications terminals that reside within address space 112.

Thus an on-premises telephone number is one that exists within the address space of the private-branch exchange, and an off-premises telephone number is one that exists within the address space of the Public Switched Telephone Network, or other type of public telecommunications network.

Some private-branch exchanges, such as exchange 104, enable the user of an on-premises terminal to associate an off-premises terminal's telephone number (e.g., the user's cell phone number, etc.) with the on-premises terminal's telephone number for features such as automatic call forwarding. In such instances the off-premises terminal's telephone number is said to be mapped to the on-premises terminal's telephone number. Typically a private-branch exchange that provides such a mapping feature stores the station mappings in a table, such as the one shown in FIG. 2 in which each depicted row corresponds to a different station mapping.

Figure 2:
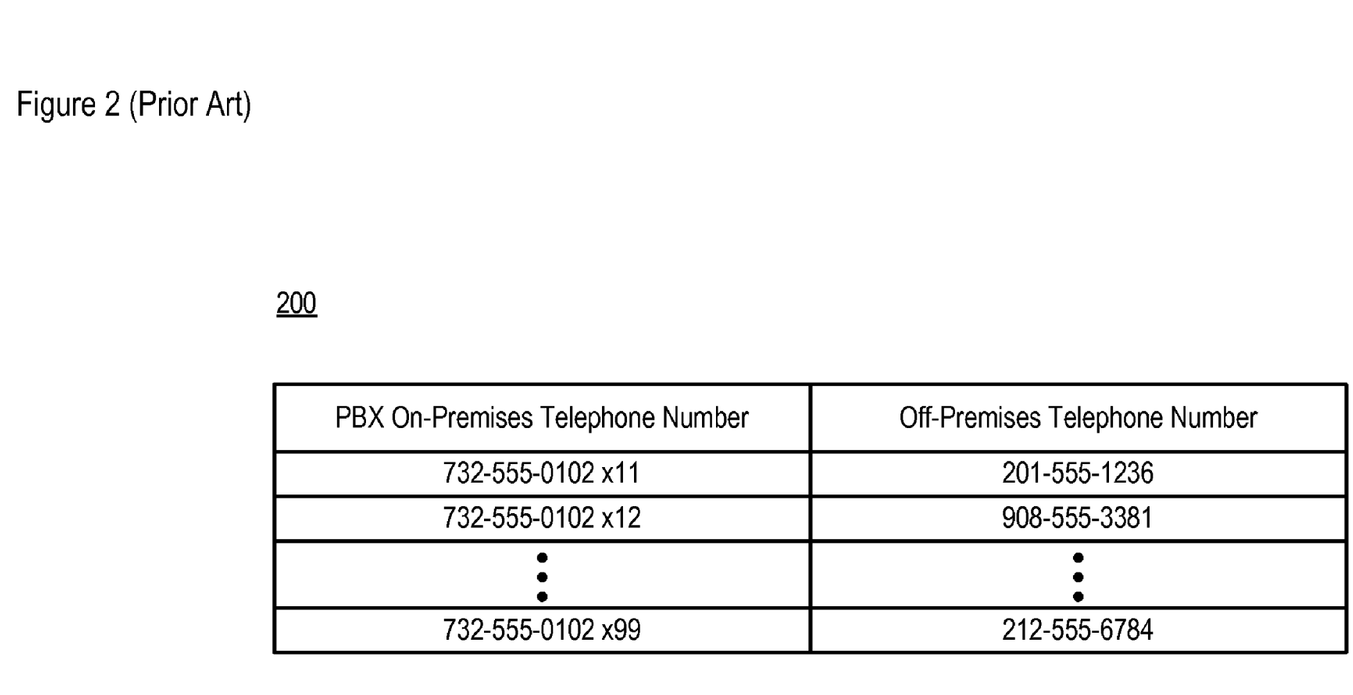
FIG. 2 depicts a prior-art station-mapping table that represents the relationship between a station extension within a private-branch exchange's address space and a telephone number within the address space of the Public-Switched Telephone Network.

Each station mapping initialized and maintained at private-branch exchange 104 comprises a different "description" of a logical association between i) a telephone extension of an on-premises terminal (i.e., terminal 103-p) within exchange 104's address space and ii) a telephone number of an off-premises terminal (i.e., terminal 101-m) within the address space of the Public-Switched Telephone Network.

For each incoming call, intended for a user of an on-premises terminal, exchange 104 uses the station mapping that corresponds to the particular user being called to determine which off-premises terminal is to be extended the incoming call, in addition to delivering the call to the user's on-premises terminal. Aside from determining how to deliver an incoming call, exchange 104 can also use a station mapping to identify an incoming call. Suppose that a first employee is being called by a second employee who is using his cell phone. The station mapping enables the call from the second employee to be identified to the first employee by the station extension of the second employee's deskset terminal, rather than by the second employee's cell phone number, which is information that might be meaningless to the first employee.

SUMMARY OF THE INVENTION

A larger enterprise system will often require two or more physically-distinct, private-branch exchanges to serve all of the employees. For example, a large company might have to engineer their enterprise system so that half of the employees receive service via a first exchange and the rest of the employees receive service via a second exchange. This means that the first exchange initializes and maintains half of the station mappings and that the second exchange initializes and maintains the other half. One ramification of this is that if a first employee who is served by the first exchange is being called, from a cell phone, by a second employee who is served by the second exchange, the incoming call will be identified by the cell phone's number because the first exchange does not necessarily know the second employee's station extension. This is inconvenient to the first employee who might be trying to figure out who is calling. To make matters worse, over the course of time the first employee might see a deskset extension sometimes being used to identify an incoming call and sometimes a cell phone number, depending on which private-branch exchange is serving the calling employee in relation to the called employee and also on how the multiple exchanges are configured.

The present invention provides the sharing of a station-mapping description with a first private-branch exchange, where the description has been initialized and maintained at a second private-branch exchange. As a result, this sharing across private-branch exchanges enables an incoming call from a second employee's cell phone to be recognized by a first employee as coming from the second employee because the incoming call is identified with the telephone extension of the caller's deskset terminal in spite of the call being placed from the cell phone, or other telephone number at large.

In accordance with the illustrative embodiment, a private-branch exchange- or other data-processing system, for that matter-acquires a station mapping description from another exchange by using a Session Initiation Protocol (SIP) subscription. Each exchange subscribes to the information maintained at the other exchanges. After the initial subscription, notifications for existing station mappings are sent to the subscriber. As mappings change, further notifications are sent. The notifications can be in response to the initial subscription, can indicate the addition of a new station mapping since the subscription event, or can indicate that a station has been deleted at a particular exchange and is no longer present.

The illustrative embodiment of the present invention comprises: transmitting, from a first data-processing system, a subscribe request to a second data-processing system at which a first station mapping has been previously initialized, the first station mapping comprising a first description of a logical association between i) a first telephone extension within the address space of the second data-processing system and ii) a first telephone number within the address space of the Public-Switched Telephone Network, and the first and second data-processing systems being physically distinct; receiving a notification that corresponds to the subscribe request, the notification comprising the first description; and identifying an incoming call by using the first telephone extension that is in the first description, the incoming call arriving at the first data-processing system, and the identifying occurring when the incoming call is from a calling number that matches the first telephone number in the first description.

DETAILED DESCRIPTION

Figure 3:
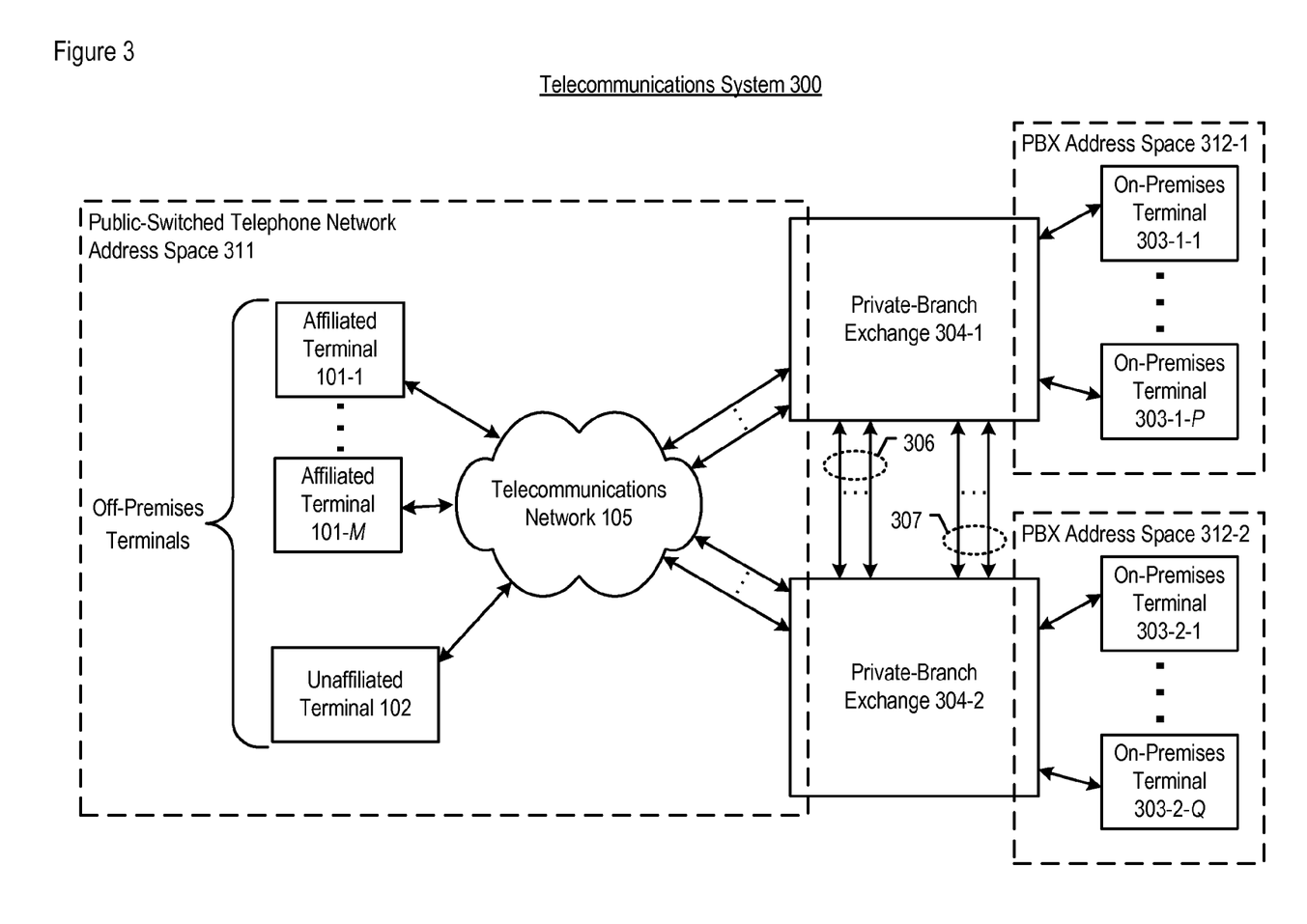
FIG. 3 depicts a schematic diagram of telecommunications system 300, in accordance with an illustrative embodiment of the present invention.

FIG. 3 depicts a schematic diagram of telecommunications system 300, in accordance with an illustrative embodiment of the present invention. Telecommunications system 300 comprises: affiliated off-premises telecommunications terminals 101-1 through 101-M, wherein M is a positive integer; unaffiliated off-premises telecommunications terminal 102; telecommunications network 105; private-branch exchanges 304-1 through 304-N, wherein N has a value of two as depicted; on-premises terminals 303-1-1 through 103-1-P associated with exchange 304-1, wherein P is a positive integer; and on-premises terminals 303-2-1 through 103-2-Q associated with exchange 304-2, wherein Q is a positive integer. The depicted components are interconnected as shown.

Private-branch exchange 304-n, wherein n has a value between 1 and N, inclusive, is a data-processing system that provides all the functionality of private-branch exchange 104 of the prior art. Exchange 304-n is also capable of performing some or all of the tasks of FIG. 4 and/or FIG. 5, which are described below. For example, exchange 304-1 might perform the tasks of FIG. 4 when it needs to retrieve station-mapping descriptions from one or more other exchanges such as exchange 304-2. Concurrently, exchange 304-2 might perform the tasks of FIG. 5 when it needs to provide the descriptions to one or more other exchanges such as exchange 304-1.

Private-branch exchange 304-1 provides service for and maintains data for on-premises terminals 303-1-1 through 303-1-P, which are equivalent to on-premises terminals 103 of the prior art. Accordingly, the telephone extensions of local, on-premises terminals 303-1-1 through 303-1-P exist in address space 312-1, which is the address space of private-branch exchange 304-1.

Similarly, private-branch exchange 304-2 provides service for and maintains data for on-premises terminals 303-2-1 through 303-2-Q, which are also equivalent to on-premises terminals 103 of the prior art. Accordingly, the telephone extensions of local, on-premises terminals 303-2-1 through 303-2-Q exist in address space 312-2, which is the address space of private-branch exchange 304-2.

The presence of two private-branch exchanges within a given enterprise is significant, in that a fraction (e.g., half, etc.) of the employees of the enterprise are affiliated with one of the exchanges (e.g., exchange 304-1, etc.) and the remaining fraction of the employees are affiliated with the other exchange (e.g., exchange 304-2, etc.). This type of situation might occur when an enterprise has a large number of employees, where such a large number cannot be served via a single exchange. The employees served by exchange 304-1 have off-premises telephone numbers (corresponding to cell phones and so forth) that are mapped to station extensions served by exchange 304-1; therefore, it can be said that these station mappings have been "initialized" and are "maintained" at exchange 304-1. Meanwhile, the employees served by exchange 304-2 have off-premises telephone numbers that are mapped to station extensions served by exchange 304-2; therefore, it can be said that these station mappings have been initialized and are maintained at exchange 304-2.

Additionally, each on-premises terminal is identified by a telephone extension, which can have an affiliated telephone number that corresponds to an off-premises, affiliated terminal **101-*m*. It is the station mapping that is initialized and maintained for each affiliated pair of telecommunications terminal identifiers (i.e., extension and number) that is used by each exchange when identifying the calling party of each incoming call. When an incoming call arrives at the enterprise's telecommunications system, the call will route directly to the private-branch exchange that maintains the particular called party's station mapping between extension and off-premises telephone. In some alternative embodiments, all calls might first route to one of the exchanges, such as exchange 304-1, and then be delivered to the host exchange, such as exchange 304-2, if different from the first exchange. Voice trunk group 306** comprises one or more voice trunks for the purpose of delivering calls between exchanges.

In accordance with the illustrative embodiment, exchanges 304-1 and 304-2 are also connected to each other with Session Initiation Protocol (SIP) trunk group 307. Trunk group 307 comprises one or more signaling trunks for the purpose of providing a call signaling path and a way by which to exchange station-mapping information, in accordance with the illustrative embodiment. As those who are skilled in the art will appreciate, a different protocol than SIP can be used to exchange the mapping information.

The enterprise system of the illustrative embodiment comprises two private-branch exchanges. It will be clear, however, to those skilled in the art, after reading this specification, how to make and use alternative embodiments in which a different number of private branch exchanges are present (i.e., N having a value other than two). As those who are skilled in the art will further appreciate, one or more of the data-processing systems performing the tasks of the illustrative embodiment can be something other than a private-branch exchange, such as a communications server or a central-office switch.

Figure 4:
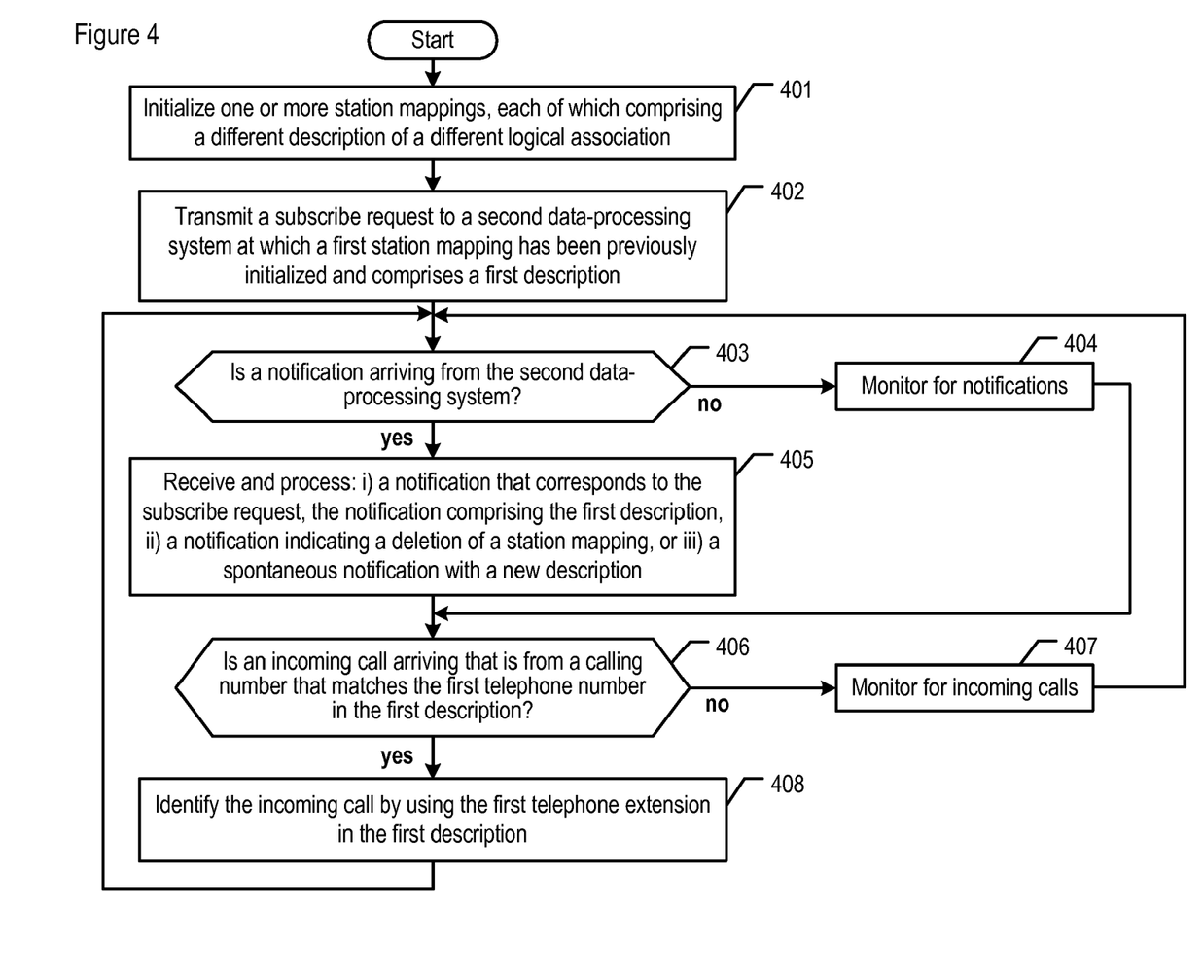
FIG. 4 depicts a flowchart of the salient tasks performed by private-branch exchange 304-1, in accordance with the illustrative embodiment of the present invention.
Figure 5:
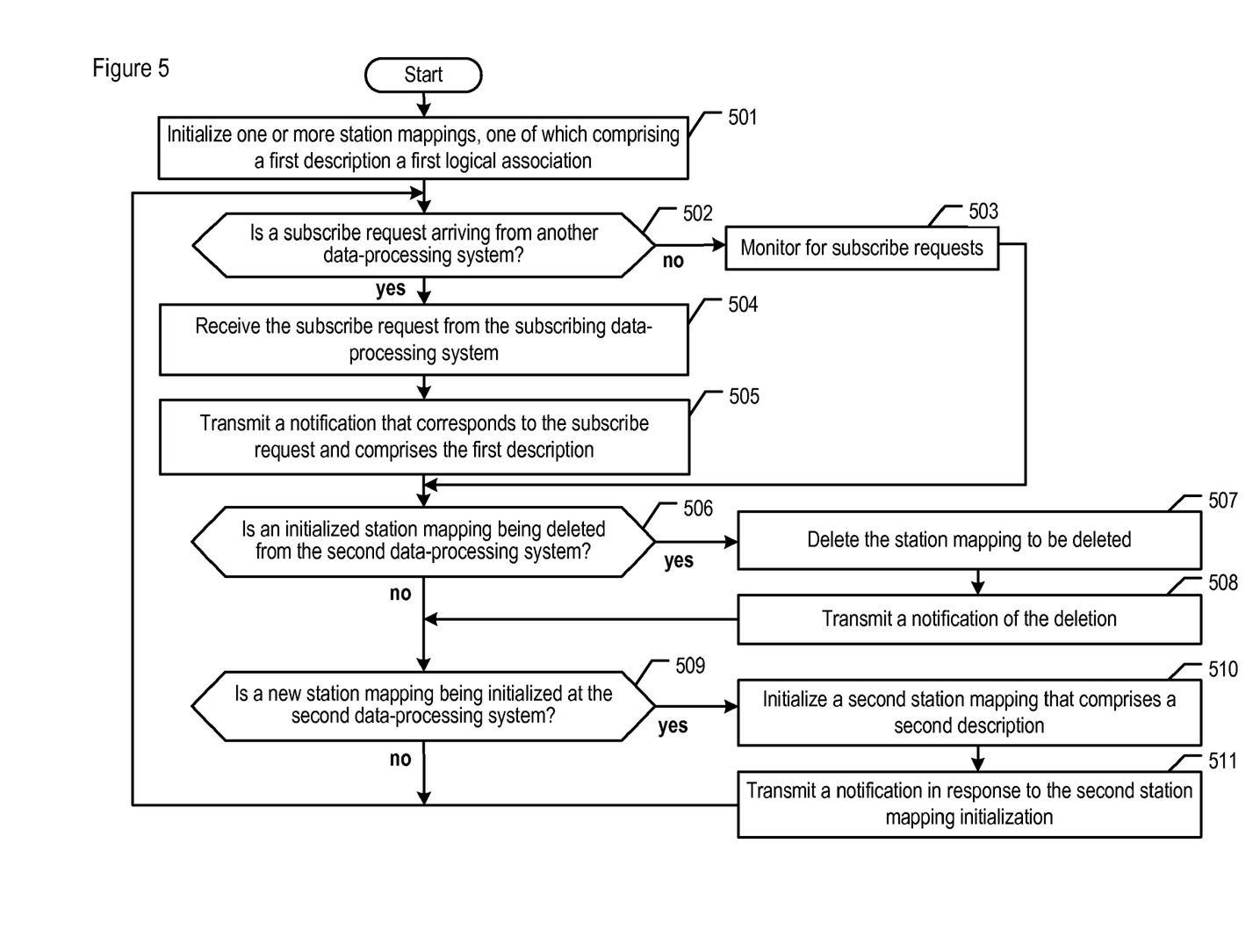
FIG. 5 depicts a flowchart of the salient tasks performed by private-branch exchange 304-2, in accordance with the illustrative embodiment of the present invention.

FIGS. 4 and 5 depict flowcharts of the salient tasks performed by private-branch exchanges 304-1 and 304-2, respectively, in accordance with the illustrative embodiment of the present invention. As those who are skilled in the art will appreciate, some or all of the tasks depicted in FIGS. 4 and 5 can be performed simultaneously or in a different order than that depicted.

In accordance with the illustrative embodiment, exchange 304-1 performs the tasks depicted in FIG. 4, including the tasks of retrieving mapping descriptions from the station-mapping records that are initialized and maintained at another exchange (i.e., exchange 304-2). Meanwhile, exchange 304-2 performs the tasks depicted in FIG. 5, including the tasks of providing the station-mapping descriptions to another exchange (i.e., exchange 304-1).

It will be clear to those skilled in the art, after reading this specification, how to make and use alternative embodiments of the present invention, in which exchange 304-1, or another other exchange for that matter, is able to retrieve mapping descriptions from one or more additional exchanges than exchange 304-2. It will also be clear to those skilled in the art, after reading this specification, how to make and use alternative embodiments, in which exchange 304-2, or another exchange for that matter, is able to provide mapping descriptions to one or more additional exchanges than exchange 304-1.

For clarity purposes, exchange 304-1 is portrayed as performing only the tasks depicted in FIG. 4 and exchange 304-2 is portrayed as performing only the tasks depicted in FIG. 5. However, it will be clear to those skilled in the art, after reading this specification, how to make and use alternative embodiments in which a given private-branch exchange performs some or all of the tasks depicted in both FIGS. 4 and 5. For example, exchange 304-1, in some alternative embodiments, might perform the tasks in FIG. 4 in order to subscribe to mapping descriptions that have been initialized elsewhere and might perform the tasks in FIG. 5 in order to notify another exchange of the mapping descriptions that have been initialized at exchange 304-1.

Referring now to task 401 in FIG. 4, exchange 304-1 initializes one or more station mappings. Each station mapping initialized at exchange 304-1 comprises a different description of a logical association between i) a telephone extension of an on-premises terminal within exchange 304-1's address space and ii) a telephone number within the address space of the Public-Switched Telephone Network.

At task 402, exchange 304-1 transmits a subscribe request to exchange 304-2, at which at least a first station mapping has been previously initialized. The first station mapping comprises a first description of a logical association between i) a first telephone extension within exchange 304-2's address space and ii) a first telephone number within the address space of the Public-Switched Telephone Network. Exchange 304-1 then monitors for a response to the subscribe request.

At task 403, if a notification is arriving from exchange 304-2, task execution proceeds to task 405. Otherwise, task execution proceeds to task 404 in order to monitor for incoming notifications.

At task 405, exchange 304-1 receives a first type of notification that corresponds to the subscribe request transmitted at task 402. The notification comprises descriptions from one or more station mappings initialized and maintained at exchange 304-2. Exchange 304-1 stores the received descriptions, so that it is able to properly identify calling parties as incoming calls arrive.

Exchange 304-1 might receive a second type of notification that indicates that a particular station mapping maintained at exchange 304-2 has been deleted, in which case exchange 304-1 would delete the description that corresponds to the deleted station mapping.

Exchange 304-1 might receive a third type of notification that comprises a description from a station mapping that has been initialized and maintained at exchange 304-2 after the initial notification was received.

At those who are skilled in the art will appreciate, other types of station-mapping-related notification can be present in some alternative embodiments of the present invention.

At task 406, task execution proceeds to task 408 if an incoming call is arriving from a calling number that matches a telephone number in one of the descriptions received from exchange 304-2 at task 405, or from a station mapping initialized at task 401. Otherwise, task execution proceeds to task 407 in order to monitor for incoming calls.

At task 408, exchange 304-1 identifies the incoming call by using the telephone extension that is present in the description that also comprises the calling number of the incoming call. In some embodiments, the incoming call is also identified or alternatively identified by using a station name that is alphanumeric in format and is part of the station-mapping description. Task execution then proceeds back to task 403, in order to process additional mapping notifications and incoming calls.

FIG. 5 depicts tasks that are executed by exchange 304-2 and concurrently with at least some of the tasks in FIG. 4. At task 501, exchange 304-2 initializes one or more station mappings. Each station mapping initialized at exchange 304-2 comprises a different description of a logical association between i) a telephone extension of an on-premises terminal within exchange 304-2's address space and ii) a telephone number within the address space of the Public-Switched Telephone Network.

At task 502, if a subscribe request is arriving from exchange 304-1, task execution proceeds to task 504. Otherwise, task execution proceeds to task 503 in order to monitor for incoming subscribe requests.

At task 504, exchange 304-2 receives a subscribe request from exchange 304-1.

At task 505, in response to having received the subscribe request at task 504, exchange 304-2 transmits a first type of notification that corresponds to the received subscribe request. The notification comprises descriptions from one or more station mappings initialized at task 501 and maintained at exchange 304-2.

At task 506, if a previously-initialized station mapping is being deleted from exchange 304-2, task execution proceeds to task 507. Otherwise, task execution proceeds to task 509.

At task 507, exchange 304-2 deletes the previously-initialized station mapping that is to be deleted.

At task 508, exchange 304-2 transmits to exchange 304-1 a second type of notification that indicates the description from the particular station mapping that is being deleted.

At task 509, if a new station mapping is being initialized at exchange 304-2, task execution proceeds to task 510. Otherwise, task execution proceeds back to task 502.

At task 510, exchange 304-2 initializes the new station mapping.

At task 511, exchange 304-2 transmits to exchange 304-1 a third type of notification that comprises a description from a station mapping that has been initialized and maintained at exchange 304-2 after the initial notification was received. Task execution then proceeds back to task 502.

The two private-branch exchanges that perform the tasks with respect to FIGS. 4 and 5 are connected to each other and have similar functionality as each other. However, in some alternative embodiments, as those who are skilled in the art will appreciate, one or more of the data-processing systems can be private-branch exchanges that are all connected to a shared subscription aggregator. The aggregator acts as a sharing hub, in that it receives subscribe requests from one or more exchanges and, in response, provides notifications back to the exchanges. In those embodiments, the subscription aggregator initializes and maintains all of the station mappings that are used in the enterprise system, so that each of the exchanges performs the tasks described with respect to FIG. 4 and the aggregator performs the tasks described with respect to FIG. 5.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
transmitting, from a first data-processing system, a subscribe request to a second data-processing system at which a first station mapping has been previously initialized, the first station mapping comprising a first description of a logical association between i) a first telephone extension within the address space of the second data-processing system and ii) a first telephone number within the address space of the Public-Switched Telephone Network, and the first and second data-processing systems being physically distinct;
receiving a notification that corresponds to the subscribe request, the notification comprising the first description; and
identifying an incoming call by using the first telephone extension that is in the first description, the incoming call arriving at the first data-processing system, and the identifying occurring when the incoming call is from a calling number that matches the first telephone number in the first description.

2. The method of claim 1 wherein calls that are intended for a user of a first telecommunications terminal associated with the first telephone extension arrive at the second data-processing system, the first telecommunications terminal being served by the second data-processing system.

3. The method of claim 2 wherein the incoming call is originated by a second telecommunications terminal associated with the first telephone number, the second telecommunications terminal receiving at least some of the calls that are intended for the user of the first telecommunications terminal.

4. The method of claim 1 wherein the incoming call is identified to a local telecommunications terminal associated with a second telephone extension that is within the address space of the first data-processing system, the local telecommunications terminal being served by the first data-processing system.

5. The method of claim 4 further comprising initializing at the first data-processing system, prior to the transmitting of the subscribe request, a second station mapping that comprises a second description of a logical association between i) the second telephone extension within the address space of the first data-processing system and ii) a second telephone number within the address space of the Public-Switched Telephone Network.

6. The method of claim 1 further comprising identifying the incoming call also by using a first station name that is alphanumeric in format, wherein the first description further comprises the first station name.

7. The method of claim 1 wherein the first and second data-processing systems are interconnected by one or more trunks that are Session-Initiation-Protocol-based and dedicated to signaling, wherein the signaling comprises i) the transmitting of the subscribe request and ii) the receiving of the notification.

8. A method comprising:
transmitting, from a first data-processing system, a subscribe request to a second data-processing system at which a first station mapping has been previously initialized, the first station mapping comprising a first description of a logical association between i) a first telephone extension within the address space of the second data-processing system and ii) a first telephone number within the address space of the Public-Switched Telephone Network, and the first and second data-processing systems being physically distinct;

initializing, at the first data-processing system, a second station mapping that comprises a second description of a logical association between i) a second telephone extension within the address space of the first data-processing system and ii) a second telephone number within the address space of the Public-Switched Telephone Network;

receiving a notification that corresponds to the subscribe request, the notification comprising the first description; and identifying an incoming call that is intended for a user of a local telecommunications terminal by using the first telephone extension that is in the first description, the local telecommunications terminal being associated with the second telephone extension and being served by the first data-processing system, the incoming call arriving at the first data-processing system.

9. The method of claim 8 wherein the identifying occurs when the incoming call is from a calling number that matches the first telephone number in the first description.

10. The method of claim 8 wherein calls that are intended for a user of a first telecommunications terminal associated with the first telephone extension arrive at the second data-processing system, the first telecommunications terminal being served by the second data-processing system.

11. The method of claim 10 wherein the incoming call is originated by a second telecommunications terminal associated with the first telephone number, the second telecommunications terminal receiving at least some of the calls that are intended for the user of the first telecommunications terminal.

12. The method of claim 10 wherein the incoming call is identified to a local telecommunications terminal associated with a second telephone extension that is within the address space of the first data-processing system, the local telecommunications terminal being served by the first data-processing system.

13. The method of claim 8 further comprising identifying the incoming call also by using a first station name that is alphanumeric in format, wherein the first description further comprises the first station name.

14. The method of claim 8 wherein the first and second data-processing systems are interconnected by one or more trunks that are Session-Initiation-Protocol-based and dedicated to signaling, wherein the signaling comprises i) the transmitting of the subscribe request and ii) the receiving of the notification.

15. A method comprising:
initializing, at a second data-processing system, a first station mapping that comprises a first description of a logical association between i) a first telephone extension within the address space of the second data-processing system and ii) a first telephone number within the address space of the Public-Switched Telephone Network;

receiving, at the second data-processing system, a subscribe request from a first data-processing system, the first and second data-processing systems being physically distinct; and transmitting, to the first data-processing system, a notification that is in response to the receiving of the subscribe request and that comprises the first description.

16. The method of claim 15 further comprising:
deleting, from the second data-processing system, the first station mapping; and
transmitting, to the first data-processing system, a notification that is in response to the deletion of the first station mapping and that comprises the first description.

17. The method of claim 15 further comprising:
initializing, at the second data-processing system, a second station mapping that comprises a second description of a logical association between i) a second telephone extension within the address space of the second data-processing system and ii) a second telephone number within the address space of the Public-Switched Telephone Network; and
transmitting, to the first data-processing system, a notification that is in response to the initialization of the second station mapping and that comprises the second description.

18. The method of claim 17 further comprising identifying an incoming call by using the second telephone extension that is in the second description, the incoming call arriving at the second data-processing system, and the identifying occurring when the incoming call is from a calling number that matches the second telephone number in the second description.

19. The method of claim 18 wherein the incoming call is identified to a first telecommunications terminal associated with a first telephone extension that is within the address space of the second data-processing system, the first telecommunications terminal being served by the second data-processing system.

20. The method of claim 15 wherein the first and second data-processing systems are interconnected by one or more trunks that are Session-Initiation-Protocol-based and dedicated to signaling, wherein the signaling comprises i) the receiving of the subscribe request and ii) the transmitting of the notification.

* * * * *